United States Patent Office 3,447,560
Patented June 3, 1969

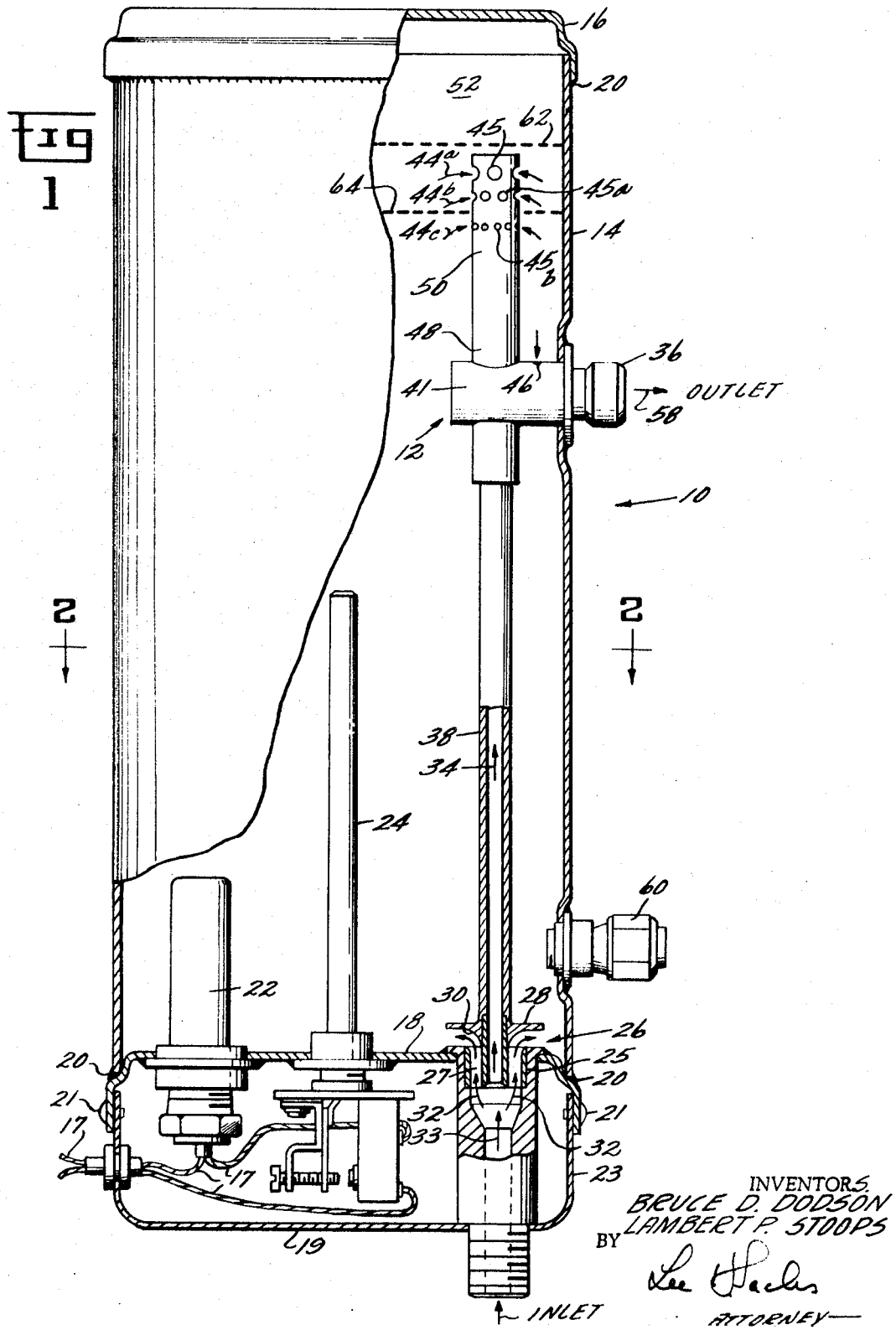

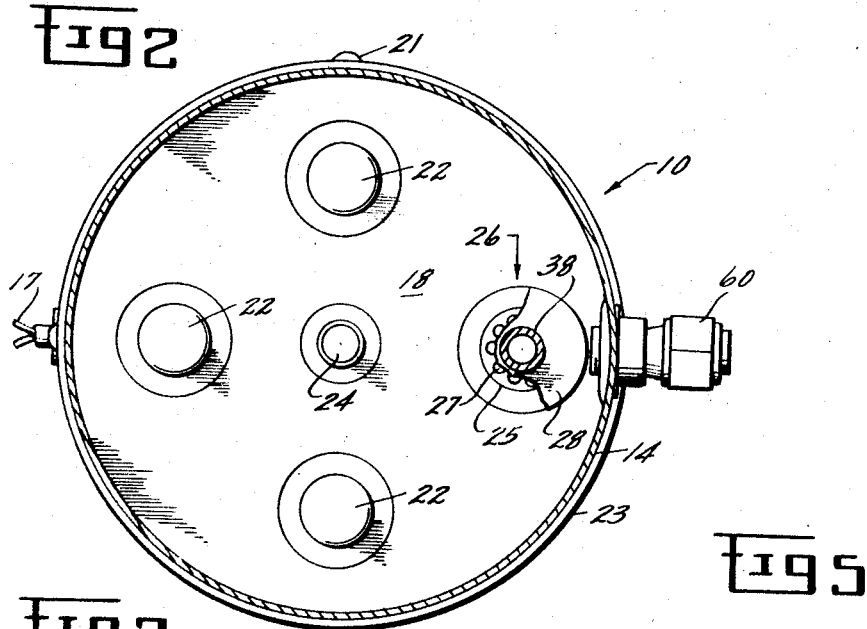
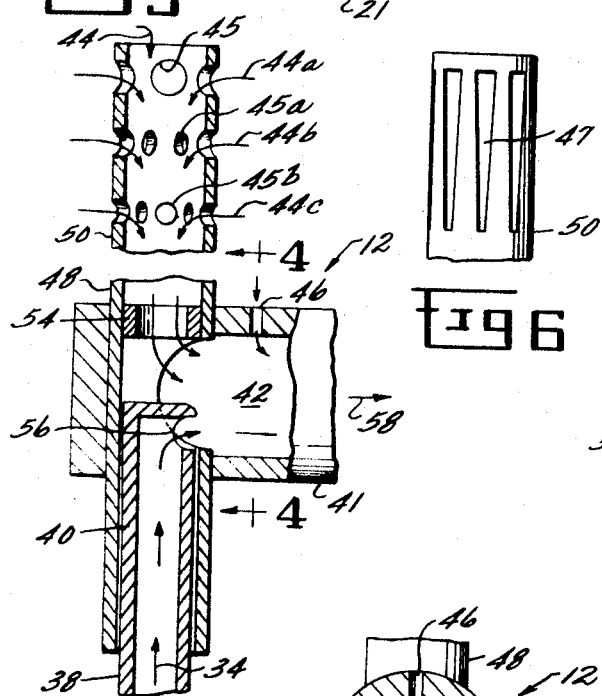
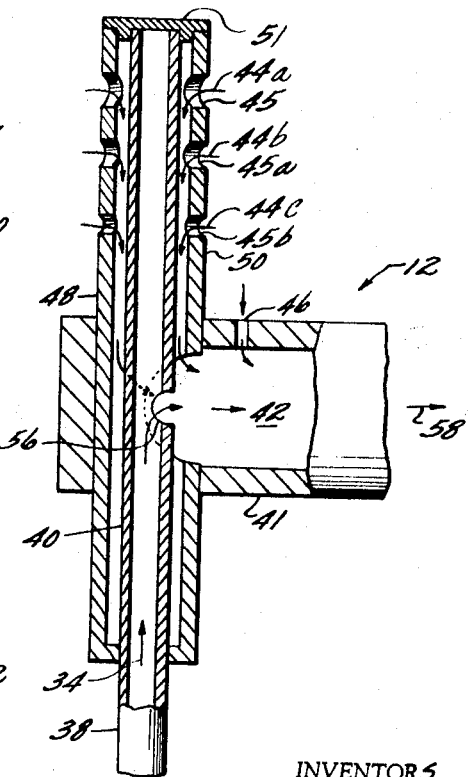
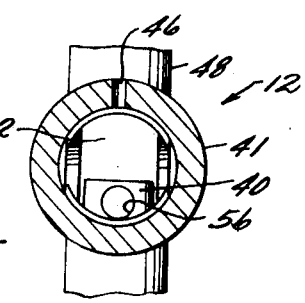

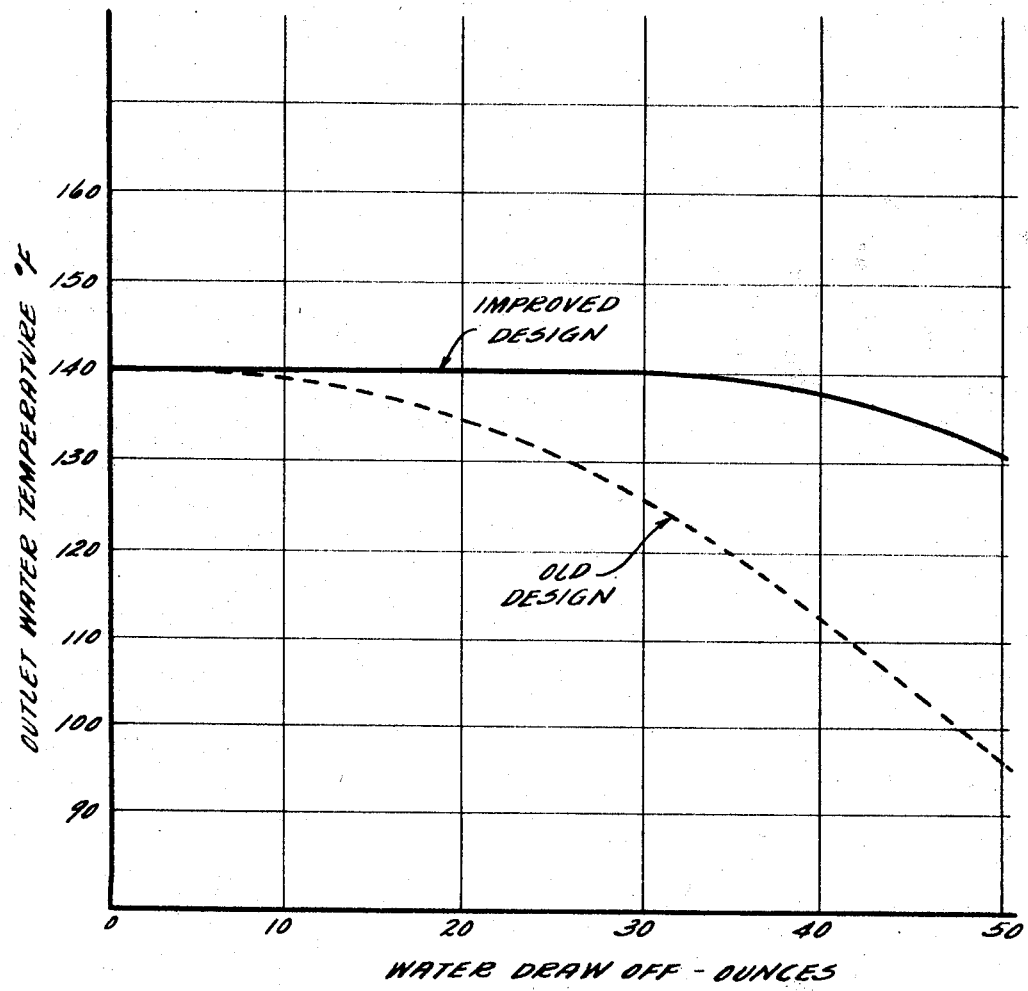

3,447,560
LIQUID HANDLING AND DISPENSING APPARATUS
Bruce Douglas Dodson, Bellevue, and Lambert Perry Stoops, Seattle, Wash., assignors to General Electric Company, a corporation of New York
Continuation of application Ser. No. 524,194, Feb. 1, 1966. This application Nov. 6, 1967, Ser. No. 681,031
Int. Cl. F16k *49/00;* F16l *53/00;* F24k *1/00*
U.S. Cl. 137—337
3 Claims

ABSTRACT OF THE DISCLOSURE

The metering and blending of liquids of different temperatures at the discharge of a heated liquid container, such as a water heating and dispensing tank, employs coordinated hot liquid and cool liquid metering portions. The hot liquid metering portion is designed to draw hot liquid at progressively smaller amounts vertically downward along that portion to preferentially draw in greater quantities the hot liquid which rises toward the top of the container. Also provided in the container is a means to introduce cooler liquid along walls of the lower portion of the tank in the manner which avoids turbulence.

---

This is a continuation of Ser. No. 524,194 filed Feb. 1, 1966, now abandoned.

This invention relates to apparatus for the handling and dispensing of heated liquids such as hot water. More particularly, it relates to a liquid metering and blending apparatus and a liquid heating and dispensing tank including such a metering and blending apparatus, for example a hot water tank.

Although this invention relates generally to liquid heating and dispensing apparatus such as hot water heaters, the problems with which the invention is concerned are not normally present in the use of such apparatus within stationary heated enclosures such as buildings. The supply of hot water for use in aircraft passenger accommodation equipment, such as for a wash basin in passenger compartment lavatories, requires the solution of a number of unique problems. Because of weight and space considerations, the supply tank must be small and compact. However, it must be capable of withstanding the freezing of water left within the tank. This can occur, for example, if the aircraft is parked unheated at temperatures below that at which water will freeze. Thus the tank cannot be completely filled as in the case with standard hot water heaters such as are used in homes.

Because of its small size and because inlet water temperature may vary over a wide range, small size liquid heating and dispensing tanks to which this invention particularly relates must heat water uniformly and without stratification within the tank. Furthermore, it must dispense water at a uniform temperature, avoiding both the discharge of relatively cold inlet water as well as the supply of exceptionally hot water from within the tank.

The problem of preventing tank damage due to expansion resulting from freezing of water in the tank can be solved by providing an air cushion at the top of the tank. During operation of some aircraft water systems the water level within the tank can vary with use of the water system. Thus it is not possible to predict accurately at all times the position of the top surface or portion of the water at which it is stored at its highest allowable temperature and from which level it is most desirable to remove first. In such a case, heated water cannot always be dispensed from the top level of the water where it is stored at its hottest condition. It must be drawn from some point between the top and the bottom.

It is a principal object of the present invention to provide apparatus for metering and blending liquids of different temperatures at varying liquid levels in a tank to attain a constant temperature range blend.

Another object is to provide a tank for the heating and dispensing of liquid, the tank including such a metering and blending apparatus as well as means to inhibit the turbulent mixing of inlet liquid with heated liquid stored in a tank.

These and other objects and advantages will be more fully understood from the following detailed description and the drawings in which:

FIG. 1 is a partially sectional view of a liquid heating and dispensing tank including one form of the metering and blending apparatus as well as the improved means to supply inlet water to the tank;

FIG. 2 is a sectional view of the tank of FIG. 1, along line 2—2;

FIG. 3 is a fragmentary sectional view of the liquid metering and dispensing apparatus shown in FIG. 1;

FIG. 4 is a sectional view on line 4—4 of FIG. 3;

FIG. 5 is a partially sectional view of another form of the liquid metering and dispensing apparatus of the present invention;

FIG. 6 is a fragmentary view of one form of the end portion of the liquid metering and dispensing apparatus of the present invention; and FIG. 7 is a graphical comparison between the present invention and the apparatus which it has replaced.

The above objects can be accomplished through the use of an improved liquid metering and blending apparatus, including a blending member having walls defining a blending chamber from which blended liquid is discharged such as to a discharge duct. Supplying liquid to the blending chamber is a first liquid carrying duct, such as for inlet water, communicating with the blending chamber to meter and to direct the first or inlet liquid into the blending chamber. Also communicating with the blending chamber is a second liquid carrying duct which meters and directs into the blending chamber liquid at a temperature which is greater than the first or inlet liquid. The second liquid carrying duct includes a metering means which in use extends vertically higher than the blending chamber, the metering means having a liquid capacity which increases with increasing vertical distance from the blending chamber.

The invention in the form of a tank includes the above described liquid metering and blending apparatus which can be located between upper and lower portions with the metering means cooperating with the second liquid carrying duct being within the tank and the balance of the apparatus being either inside or outside of the tank. The lower portion of the tank includes heating means and temperature sensing means connected with the heating means to control the heating means as a function of the liquid temperature in the tank preferably sensed at various liquid levels. Means are included to introduce liquid, such as inlet water, into the tank along walls of the bottom or lower portion of the tank in a manner which avoids turbulent mixing of the inlet liquid with the liquid stored in the tank.

Referring to FIG. 1, the liquid metering and blending apparatus of the type detailed in FIGS. 3, 4 and 5 is shown generally at 12 within the tank shown generally at 10. Although tank 10 can have a variety of shapes and sizes such as rectangular, spherical and the like, it is more readily manufactured as a cylindrical tank including a cylindrical side wall portion 14 enclosed by top portion 16 and bottom portion 18. One typical size is that shown in FIG. 1. In the embodiment of FIG. 1, the top portion 16 and bottom portion 18 are welded to the side or intermediate portion 14 such as at 20. Other joining means can be used depending upon the material of construction of the tank.

Mounted within the tank through the bottom portion 18 are a plurality of heaters 22, also shown in FIG. 2. Centrally disposed at the bottom 18 of the tank is a temperature sensing means such as a commercially available adjustable thermostat 24. In small tanks such as that shown in full in FIG. 1, it is essential that temperature sensing means 24 be of a type which senses and preferably integrates temperature over a substantial portion of the tank rather than at any single point. Temperature sensing means 24 in FIG. 1 extends about half-way through the tank for vibration inhibiting purposes. However, such means could extend to the top portion of the tank when vibration, such as exists in aircraft operation, is not a problem. Heaters 22 are located as close as possible to the lower portion of the tank. Ideally the entire lower portion would act as a heater. Thermostat 24 and heaters 22 are connected to a source of electrical power (not shown) through electrical conductors 17 so that thermostat 24 controls the operation of heaters 22 as a function of the temperature of the liquid in tank 10 in a manner which is well known in the art. Electrical conductors or wires 17 can connect with an over temperature sensing device (not shown) to sense temperature at the top of the tank should temperature sensing means 24 fail to operate properly. In such instance the power to heaters 22 can be shut off automatically.

In the bottom portion 18 of tank 10 is a liquid inlet means shown generally at 26 in FIGS. 1 and 2. The inlet means 26 supplies inlet liquid to the tank as well as to the liquid metering and blending apparatus 12 as will be described later in more detail. Liquid inlet means 26 includes a liquid guide member 28 having a guide surface 30 in the path of that portion of the inlet liquid 32 which is directed through holes 27 into the tank.

In FIG. 2, guide member 28 is shown in partial section to show a support member 25 having holes or channels 27 through which inlet liquid passes and is directed and guided by surface 30 of member 28 along bottom portion 18 of the tank. Holes or channels 27 are not intended to restrict or meter the flow of inlet liquid into the tank.

Guide surface 30 of guide member 28, shown to be accurate in FIG. 1, directs a portion 32 of inlet liquid 33 along the bottom portion 18 of the tank 10 and toward heaters 22 and thermostat 24. The gradual change in slope of surface 30 avoids sharp impingement of the inlet liquid 32 on a surface such as a baffle perpendicularly disposed with respect to the initial direction of inlet liquid 33. This arrangement avoids turbulence and feeds inlet liquid into the tank 10 without its mixing with heated liquid stored in the tank. Thus because of the small size of the tank of FIG. 1, inlet liquid 32 is inhibited not only from mixing with the stored liquid but also from passing directly toward the upper portion of the tank in an uncontrolled stream which might be led directly to the tank outlet 36.

A portion of the inlet liquid 34 passes through inlet liquid guide duct 38 which communicates with or actually forms part of a first liquid carrying duct portion 40, shown in more detail in FIGS. 3 and 4. Duct portion 40 directs and, through orifice 56, meters inlet liquid into the blending chamber.

Referring more particularly to FIGS. 3 and 4, blending member 41 blends in its blending chamber 42 inlet liquid 34 with tank liquid which can be at various temperatures represented by flow arrows 44, 44a, 44b and 44c. Some tank liquid passes through port 46 used in the filling of tank 10 as will be described later.

Communicating with the blending chamber 42 is a second liquid carrying duct 48 having an end portion starting at about 50 in the embodiment shown in the drawings. End portion 50 includes heated liquid metering means in the form of ports or orifices the size of which increases with increasing vertical distance from blending chamber 42.

As used with respect to the orifices or ports or other liquid carrying openings, such as those communicating with the interior of tank 10 through end portion 50, the term "liquid capacity" means that amount of liquid passing through a port or orifice under specific conditions. According to the present invention, the sum of the liquid capacities of the metering means such as ports or orifices at any selected level is greater than the sum of the liquid capacities of orifices at a lower level.

A lower liquid capacity portion of the metering means in use is located vertically lower than the lowest level of liquid to be carried by the tank. However, the greatest volume of liquid such as water will pass from tank 10 into duct 48 through the uppermost passages or orifices. This is desirable to enable removal of the highest level of liquid in the tank at the most rapid rate while at the same time providing for removal of liquid at levels below the liquid surface. This arrangement avoids pumping air cushion 52 through outlet 36.

Although orifices 45, 45a and 45b are shown to be in the rows at uniform axial distance from blending chamber 42, it will be understood that they can be dispersed in any manner through the surface of the end portion 50 provided the sum of their liquid capacities are coordinated to be increasing with increasing vertical height from blending member 41 when the apparatus is in use. Slots of type 47 shown in FIG. 6 can be used rather than orifices. The width of slots 47, and hence their liquid capacity, when mounted for use increases with increasing vertical distance from mixing member 41.

In FIG. 3, within duct 48 there is provided a second duct metering means or orifice 54 the liquid capacity of which is coordinated with the liquid capacity of a first duct metering means or orifice 56 in duct 40 carrying the inlet liquid 34. Proper mixing of liquid from ducts 40 and 48 provided an outlet liquid 58 within a uniform temperature range. FIG. 4 is a section along line 4—4 of FIG. 3 showing orifice 56 as well as other members.

One alternate arrangement for coordinating the flow of inlet liquid 34 with the tank liquid represented by arrows 44a, 44b and 44c is shown in FIG. 5. Duct 38 traverses the entire length within duct 48 and end portion 50 terminating in a cap 51. The annular liquid capacity between the two ducts is selected to form the second duct metering means to meter liquid removed directly from the tank.

In the embodiment shown in FIG. 1, the liquid metering and blending apparatus shown generally at 12 is secured through a wall of the tank such as by welding. Similarly, heater 22, thermostat 24 and liquid inlet means 26 can all be secured along with a pressure relief valve 60, if one is desired, by welding in order to provide a light weight sealed unit. However, in order to allow access to adjust or replace heaters 22 and thermostat 24, a cover 23 is attached with bottom portion 18 such as by screws 21.

After the tank and the liquid metering and blending apparatus are assembled such as is shown in FIG. 1, the inlet can be connected with a source of liquid such as water and the outlet can be connected with a valve means such as the faucet of a lavatory wash basin. When connected, the tank is filled by opening a valve (not shown) which controls the liquid inlet and opening a valve (not shown) which controls the outlet flow. Water then begins to fill the tank expelling air through outlet 58 until the level of water in the tank covers air shut off port 46. At this point the valve controlling the outlet flow is generally closed.

When the liquid in tank 10 covers port 46 and fills blending chamber 42, air which becomes air cushion 52 is entrapped in the top portion of the tank. With outlet 58 closed or when the inlet flow rate is greater than that of the outlet, inlet liquid continues to fill the tank until it has compressed the air in the top of the tank to a point at which the pressure exerted by the compressed air and the pressure exerted by the inlet water is equal or at equilibrium. For example, in some system an inlet water pressure of 25 p.s.i.g. will raise the level of the water in the tank to that represented by broken line 62 in FIG 1. Thi is called the high pressure liquid or water level in the tank and is vertically above the end portion 50 of the duct 48. In some aircraft systems, inlet water pressure will sometimes fall. When the tank is operated in such a variable pressure system, a second level 64 lower than the first level will be reached.

Thus there is provided air cushion 52 of a volume which then fully compressed by frozen liquid will avoid rupture of the tank. The volume of air cushion 52 in a variable inlet pressure system changes within the tank between a smaller volume limited by 62 and a larger volume limited by 64. The metering means such as orifices 45, 45a and 45b are arranged such that the lower orifices are below the low pressure level 64 in order to allow liquid to be drawn from within the tank when the liquid in the tank is at the low pressure level. However, the total liquid capacity of the orifices vertically closets to blending member 41 must be selected to be large enough to supply sufficient liquid called for by second duct metering means or orifice 54 as shown in FIG. 3 or by the annular liquid capacity fixer by ducts 40 and 48 in FIG. 5 to inhibit the drawing of air from air cushion 52.

With the water at the high pressure level 62, it is desirable to remove as much as possible of the hottest water which collects at the top of the tank. Thus the size or liquid capacity of the metering orifices in end portion 50 as well as its inside diameter if open at its top as shown in FIG. 3 are selected to present varying resistance to the flow of liquid from within tank 10 to pass the desired amount of liquid according to the varying pressure between the high pressure level 62 and the lower pressure level 64, coordinated with the liquid capacity of metering means 54 and of metering means 56.

Although the tank of the present invention as shown in the drawings includes a discharge means cooperating with the liquid metering and blending apparatus mounted through a side wall of the tank, it should be understood that discharge can be through any portion of the tank providd that at least liquid metering 45c as well as 54 and 56 and the air shut off port 46 are located to be below the highest level of liquid in the tank during operation.

In one typical system, inlet water at 25 p.s.i.g. and within a temperature range of about 35–60° F. is fed into a tank having a liquid capacity of about 50 fluid ounces. The desired outlet temperature is at a level no greater than 140° F. and preferably at about 120° F. Using the apparatus of the present invention, the outlet temperature for an inlet temperautre of 60° F. has been controlled with 10° F. when drawing off as much as 48 ounces of water. This operation is shown graphically by the curves of FIG. 7 in which typical performance for the improved design of the present invention is compared with another design used in commercial aircraft. The curve represents a rate of withdrawal of one gallon per minute under an inlet pressure of 25 psig. It is readily seen that the improved design of the present invention maintains its stability while drawing off the equivalent of nearly a full tank of water. The old design drops the temperature from 140° F. to below 100° F. during the same draw-off test.

The old design used a cartridge heated extending from the top cover nearly to the bottom of the tank with a thermostat sensing temperature at a point near the bottom of the tank. Thus water heated by the heater rose to the top of the tank along the surface of the heater without mixing with cooler water in the tank. The thermostat, sensing cooler water at the bottom of the tank away from the heated surface area, continued to call for heat. When water was drawn from such tank in repeated 4 ounce quantities, the water temperature in the top of the tank rose sufficiently high to activate an over-temperature switch set at 108° F. This situation created scalding or steaming conditions for wash basin use.

Although the present invention has been described in connection with specific examples and embodiments, it will be understood by those skilled in the art that various modifications and variations can be made without departing from the scope of the present invention. The appended claims are intended to cover such variations and modifications.

What is claimed is:

1. A small tank for heating and dispensing heated liquid for vehicle passenger accommodations, the tank being sealed except for the provision for liquid inlet and discharge and comprising:

an upper portion;

a lower portion; and an intermediate portion joining the upper and lower portions;

the tank during operation including an entrapped air cushion between the upper portion and the heated liquid to partially control movement of the liquid during operation and to allow for expansion of the liquid by further compression of the air cushion if the liquid becomes frozen;

heating means adjacent the lower portion of the tank;

temperature sensing means in the tank electrically connected with the heating means to control the heating means as a function of liquid temperature in the tank;

means to introduce liquid into the tank along walls of the lower portion of the tank to inhibit direct turbulant flow of such introduced liquid into the upper portion of the tank;

discharge means;

a liquid metering and blending apparatus communicating and cooperating with the discharge means to discharge liquid from the tank, comprising:

(a) a blending member having walls defining a blending chamber communicating with the discharge means;

(b) a first liquid carrying duct communicating with the blending chamber to direct a first liquid into the blending chamber and including first duct metering means;

(c) a second liquid carrying duct communicating with the blending chamber to direct into the blending chamber a second liquid at a temperature greater than the first liquid;

(1) the second liquid carrying duct including a metering means comprising a second duct metering means and a heated liquid metering means located within the tank and extending vertically higher than the blending chamber toward the upper portion of the tank, (2) the heated liquid metering means being located within the tank, vertically higher than the blending chamber, the liquid capacity of any selected level of the metering means being greater than the liquid capacity at a lower level with respect to the vertical distance from the blending chamber, the liquid capacity of the level of the metering means vertically closest to the blending chamber having a liquid capacity at least as great as the second duct metering means.

2. The tank of claim 1 in which the discharge means discharges liquid from the tank through the intermediate portion of the tank.

3. The improved water tank as described in claim 1 in which the upper and lower portions are connected with a cylindrical side wall, and in which:
- the heating means is in the tank;
- the temperature sensing means senses temperatures at various levels in the tank;
- the discharge means discharges water from the tank through the side wall;
- the liquid metering and blending apparatus is a water handling apparatus connected with the discharge means and in which;
    - (a) the blending member is within the tank;
    - (b) the first liquid carrying duct directs inlet water into the blending chamber, the first duct metering means including a metering orifice to control the flow of inlet water into the blending chamber;
    - (c) the second liquid carrying duct being within the tank and directing into the blending chamber heated water from within the tank at a temperature greater than the inlet water;
        - (1) the second liquid carrying duct terminating in an end portion located within the tank and extending toward the top of the tank vertically higher than the blending chamber but spaced from the top of the tank,
        - (2) the end portion including the heated liquid metering means the liquid capacity of which at any selected level being greater than the liquid capacity at a lower level with respect to the vertical distance from the blending chamber,
        - (3) the heated liquid metering means including a plurality of metering orifices arranged at a plurality of distances vertically from the blending chamber, the sum of the liquid capacity of the orifices at any selected vertical distance with respect to the blending chamber being greater than the sum of the liquid capacities or orifices at a lower vertical distance from the blending chamber; and
    - (d) water inlet means in the bottom of the tank to introduce inlet water into the tank along the bottom of the tank and including an inlet water guide duct within the tank communicating with the first liquid carrying duct of the liquid metering and blending apparatus to supply inlet water to the first liquid carrying duct.

References Cited

UNITED STATES PATENTS

| | | | |
|---|---|---|---|
| 535,167 | 3/1895 | Kotz | 222—564 |
| 2,891,574 | 6/1959 | Dahlberg | 137—577 |
| 3,065,764 | 11/1962 | Lyle | 137—337 |
| 3,190,284 | 6/1065 | Koepf | 126—362 |
| 3,245,430 | 4/1966 | Enterante | 137—637 |

ROBERT B. REEVES, *Primary Examiner.*

N. L. STACK, JR., *Assistant Examiner.*

U.S. Cl. X.R.

126—362; 219—316; 222—145; 146